US010835075B2

(12) United States Patent
De'Longhi et al.

(10) Patent No.: US 10,835,075 B2
(45) Date of Patent: Nov. 17, 2020

(54) BUILT-IN COFFEE MACHINE

(71) Applicant: De'Longhi Appliances S.R.L., Treviso (IT)

(72) Inventors: Giuseppe De'Longhi, Treviso (IT); Denis Scomparin, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 153 days.

(21) Appl. No.: 16/015,377

(22) Filed: Jun. 22, 2018

(65) Prior Publication Data
US 2018/0368609 A1 Dec. 27, 2018

(30) Foreign Application Priority Data

Jun. 23, 2017 (IT) .................. 102017000070372

(51) Int. Cl.
*A47J 31/42* (2006.01)
*A47J 31/44* (2006.01)
*A23F 5/26* (2006.01)
*A47J 31/46* (2006.01)
*A47J 31/52* (2006.01)
*A47B 77/10* (2006.01)

(52) U.S. Cl.
CPC ................ *A47J 31/42* (2013.01); *A23F 5/26* (2013.01); *A47J 31/4407* (2013.01); *A47J 31/4428* (2013.01); *A47J 31/46* (2013.01); *A47J 31/52* (2013.01); *A47B 77/10* (2013.01)

(58) Field of Classification Search
CPC .... A47J 31/42; A47J 31/4407; A47J 31/4428; A47J 31/46; A47J 31/52; A23F 5/26; A47B 77/10
USPC ................. 99/279, 285, 300, 483, 468, 286
See application file for complete search history.

(56) References Cited

U.S. PATENT DOCUMENTS

| 2005/0172821 | A1* | 8/2005 | Chen .................. A47J 31/0668 99/279 |
| 2009/0130277 | A1* | 5/2009 | Bressner ............... A23N 12/08 426/466 |
| 2016/0045061 | A1* | 2/2016 | Balestier ............ A47J 31/4457 99/285 |

* cited by examiner

Primary Examiner — Phuong T Nguyen
(74) Attorney, Agent, or Firm — Blank Rome LLP

(57) ABSTRACT

The built-in coffee machine (1) comprises components (4, 5, 6, 7, 8, 9, 10, 11, 12) housed in a box frame (3) and means for the forced circulation of a flow of air in turn comprising an air channel internal of said box frame (3) for the dehumidification and cooling of the environment internal of said box frame (3) and at least one fan (15) for forced circulation of the flow of air along said air channel (16), the box frame (3) advantageously supporting a support platform (13) for cups (14) towards which an air delivery section (17) of the air channel (16) is oriented for heating said cups (14).

17 Claims, 10 Drawing Sheets

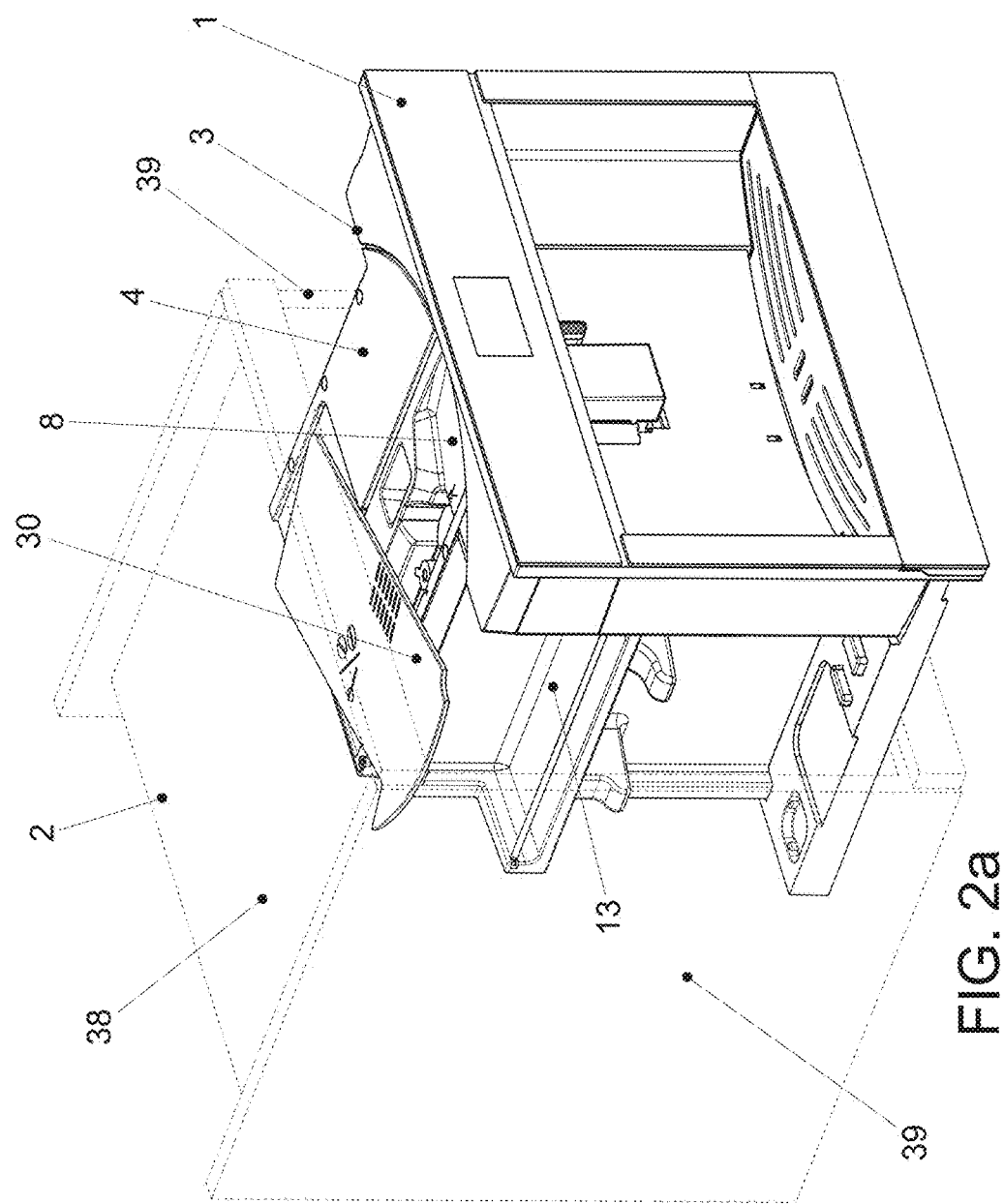
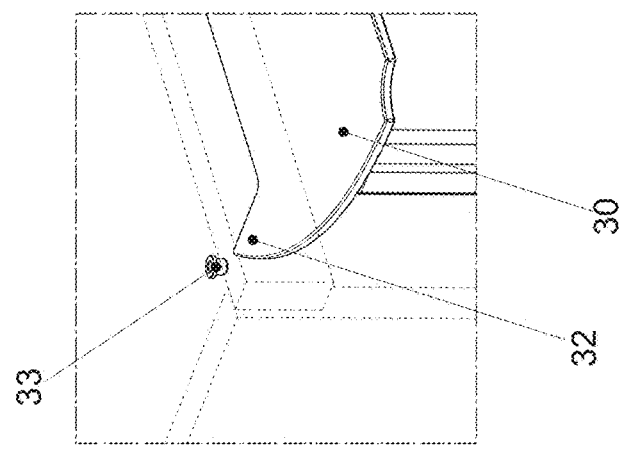
FIG. 2a
FIG. 2b

BUILT-IN COFFEE MACHINE

The present invention refers to a built-in coffee machine.

The market at present offers a version of a coffee machine that can be built-in within a cabinet.

The built-in coffee machine comprises an external box frame housing a boiler, a supply pump for supplying infusion water, an infuser unit, a grinder for grinding coffee beans, a supply hopper for supplying coffee beans to the grinder, a tank for infusion water, power and control electronics, a container for collecting spent coffee grounds, and a drip collector tray.

The presence of steam and moisture internally of the box frame due to normal operation of the coffee machine obliges carrying out a sealing of the power and control electronics with the aim of preventing any electrical risk that might be dangerous for the user and threaten the integrity of the components of the coffee machine.

However, sealing the electronics has a significant effect on the final cost of the product.

To obviate this drawback it has been proposed to cool and dehumidify the environment internal to the box frame using a fan.

This solution enables avoiding the sealing of the power and control electronics but with the result that energy consumption is increased due to the power supply to the fan.

The technical task of the present invention is, therefore, to provide a built-in coffee machine which obviates the above-described technical drawbacks of the prior art.

Within the context of this technical task, an object of the invention is to provide a built-in coffee machine suitable for conditioning the environment internal to the box frame and optimising energy consumption.

A further object of the invention is to realise a built-in coffee machine suitable for precise control of the environment parameters to which the coffee beans are exposed in the hopper so as to optimise the organoleptic properties of the product dispensed into the cup.

A further object of the invention is to realise a built-in coffee machine suitable for precise control of the working parameters thereof for dispensing into the cup a product perfectly responding to the selection made by the user.

A further but not least object of the invention is to realise a compact built-in coffee machine, easy to assemble and install, safe to handle and providing easy access to all components thereof for cleaning, maintenance, replacement, for emptying the container for collecting spent coffee grounds and the drip collector tray, and for filling the hopper with the coffee beans and for filling the infusion water tank.

The technical task, as well as these and other objects according to the present invention are achieved by realising a built-in coffee machine comprising components housed in a box frame and a means for the forced circulation of a flow of air in turn comprising an air channel internal to said box frame for the dehumidification and cooling of the environment internal to said box frame and at least one fan for the forced circulation of said flow of air along said air channel, characterised in that said box frame supports a support platform for cups towards which an air delivery section of said air channel is oriented for heating said cups.

The components of the built-in coffee machine comprise a boiler, a supply pump for supplying infusion water, an infuser unit, a grinder for grinding coffee beans, a supply hopper for supplying coffee beans to the grinder, a tank for infusion water, power and control electronics, a container for collecting spent coffee grounds, and a drip collector tray.

Said air channel is advantageously in communication with said hopper so as to condition the environment to which the coffee beans are exposed.

Said air channel is advantageously in communication with said power and control electronics so as to condition the environment to which said power and control electronics are exposed, which as a consequence can be free of seals.

Other characteristics of the present invention are further defined in the following claims.

Further characteristics and advantages of the invention will become more apparent from the description of a preferred, but not exclusive, embodiment of the built-in coffee machine according to the invention, which is illustrated by way of approximate and non-limiting example in the attached drawings, in which:

FIG. 2a is shows axonometric view of the built-in coffee machine with the cover of the hopper open;

FIG. 2b shows the cover pulling system in detail;

Figure 1:
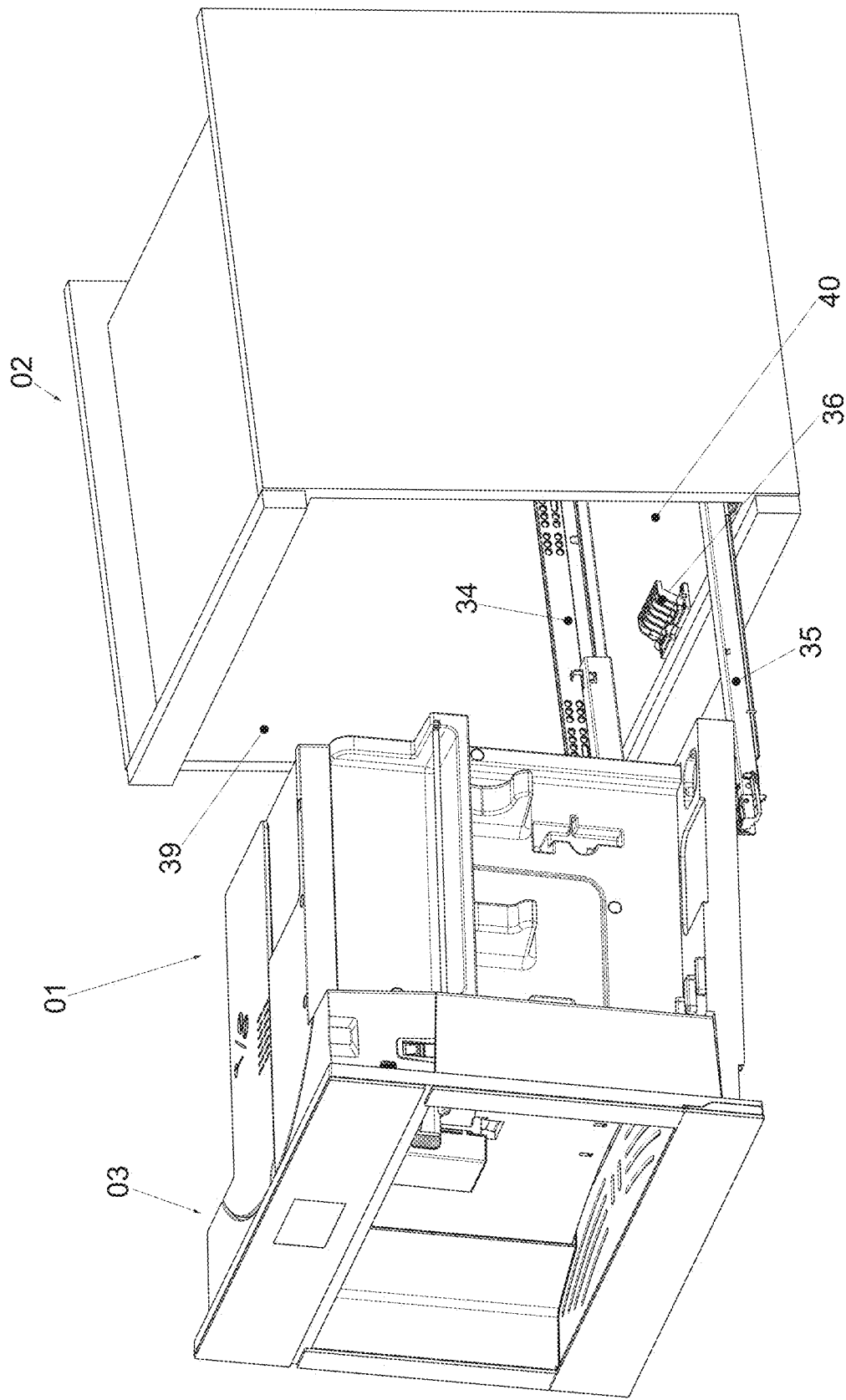
FIG. 1 shows an axonometric view of the built-in coffee machine extracted from the cabinet.
Figure 3:
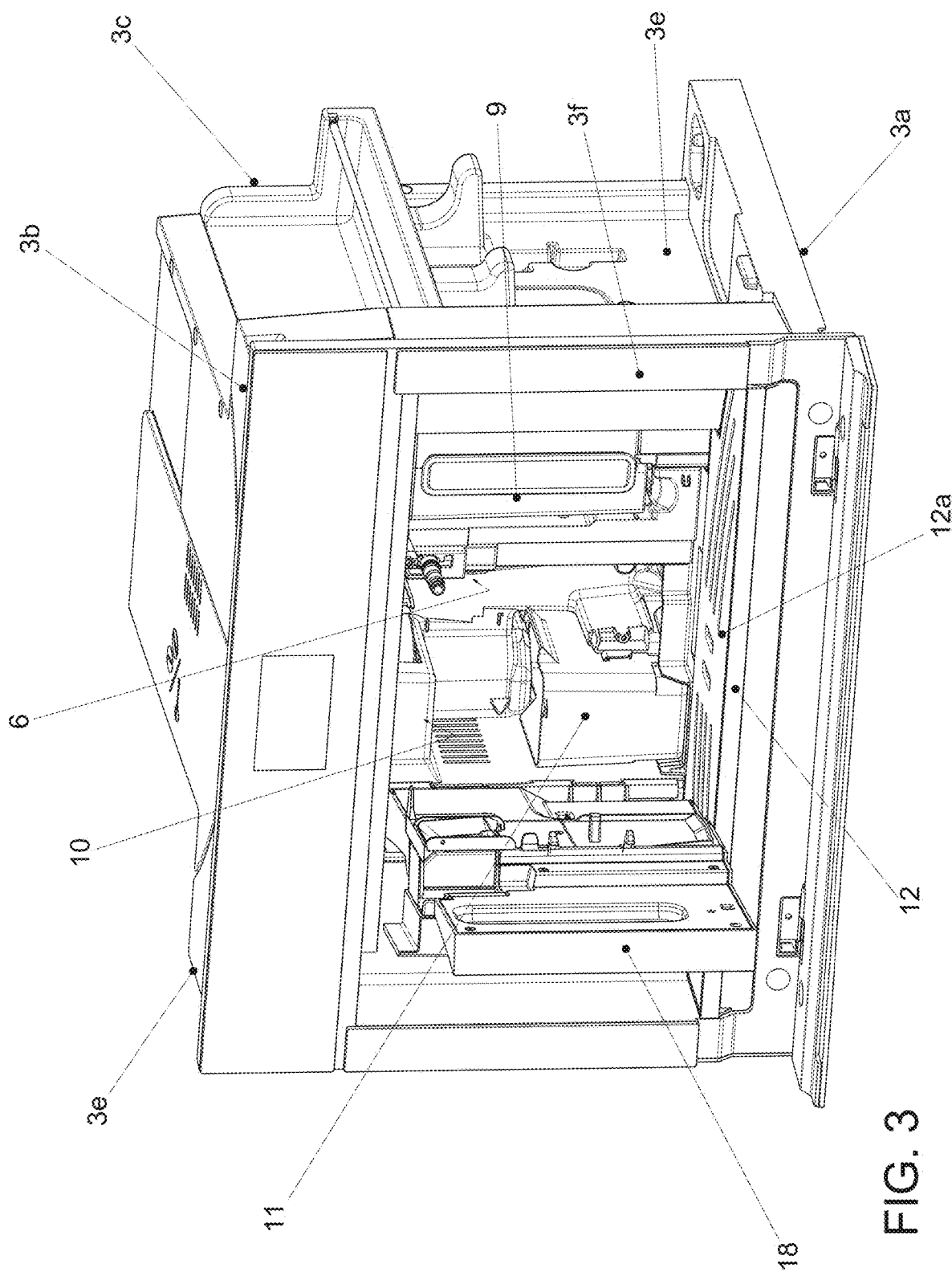
FIG. 3 shows a frontal axonometric view of the built-in coffee machine with the front doors open.
Figure 4:
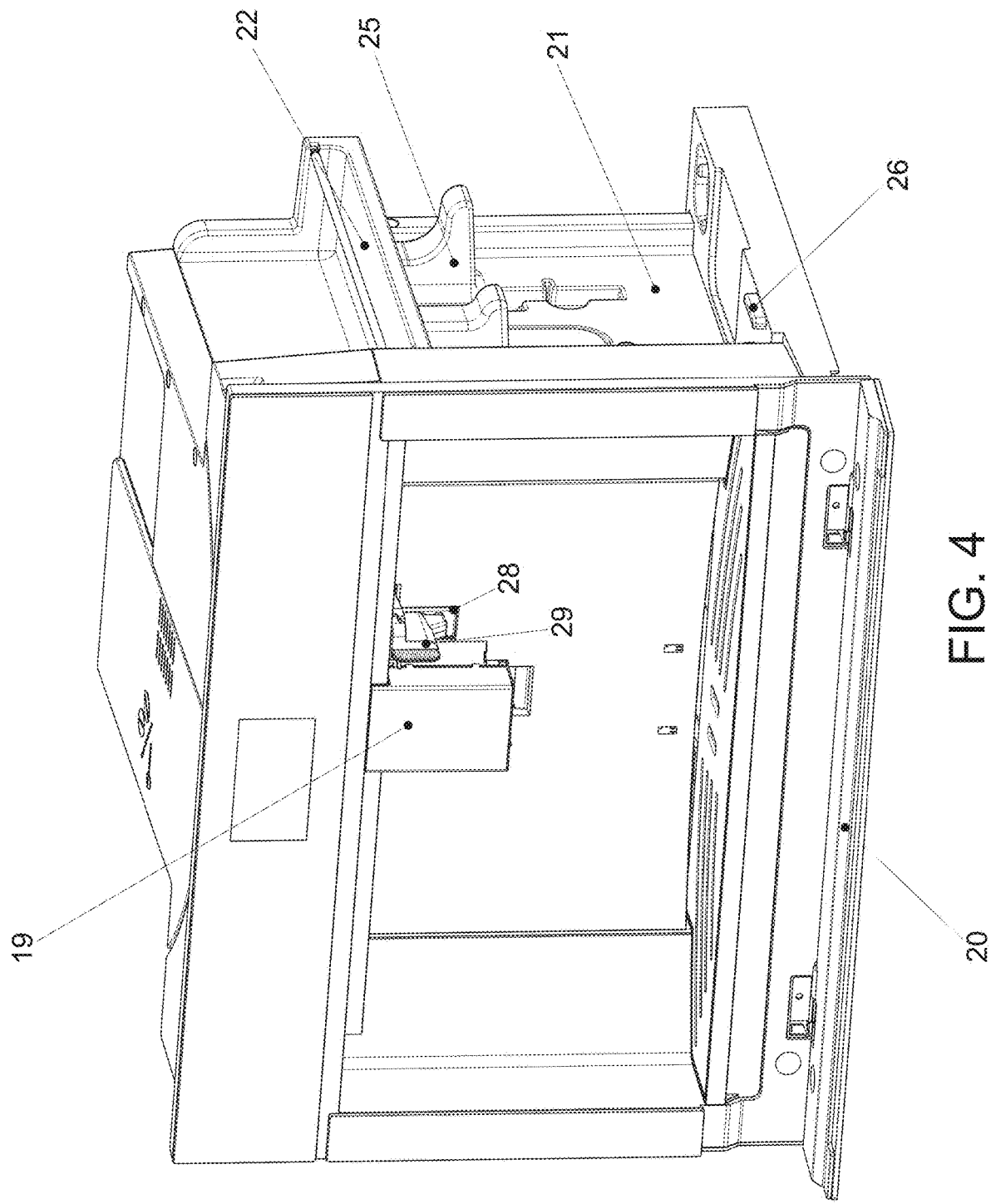
FIG. 4 shows a frontal axonometric view of the built-in coffee machine with the front doors closed.
Figure 5:
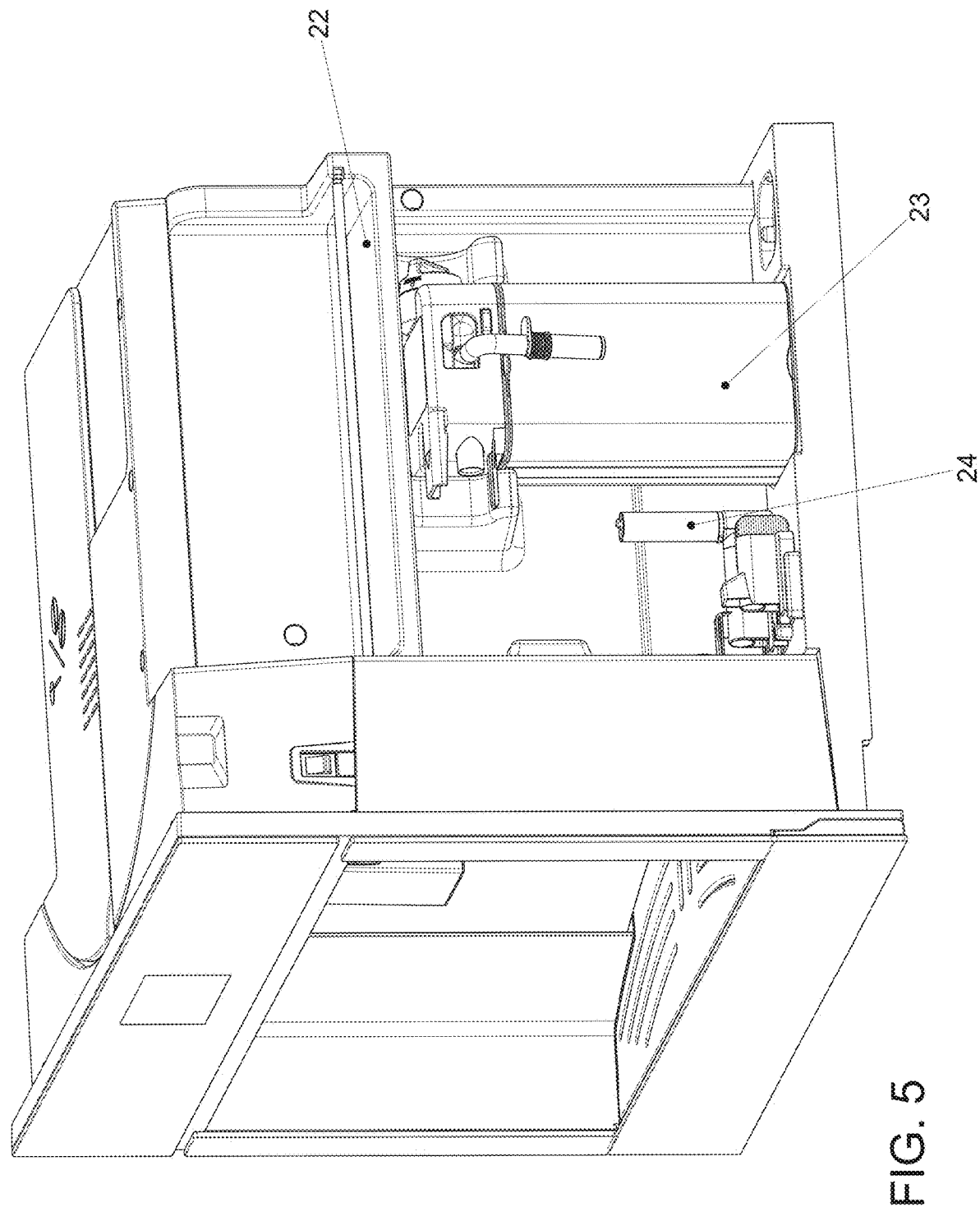
FIGS. 5 and 6 show lateral axonometric views of the built-in coffee machine with the accessories.
Figure 6:
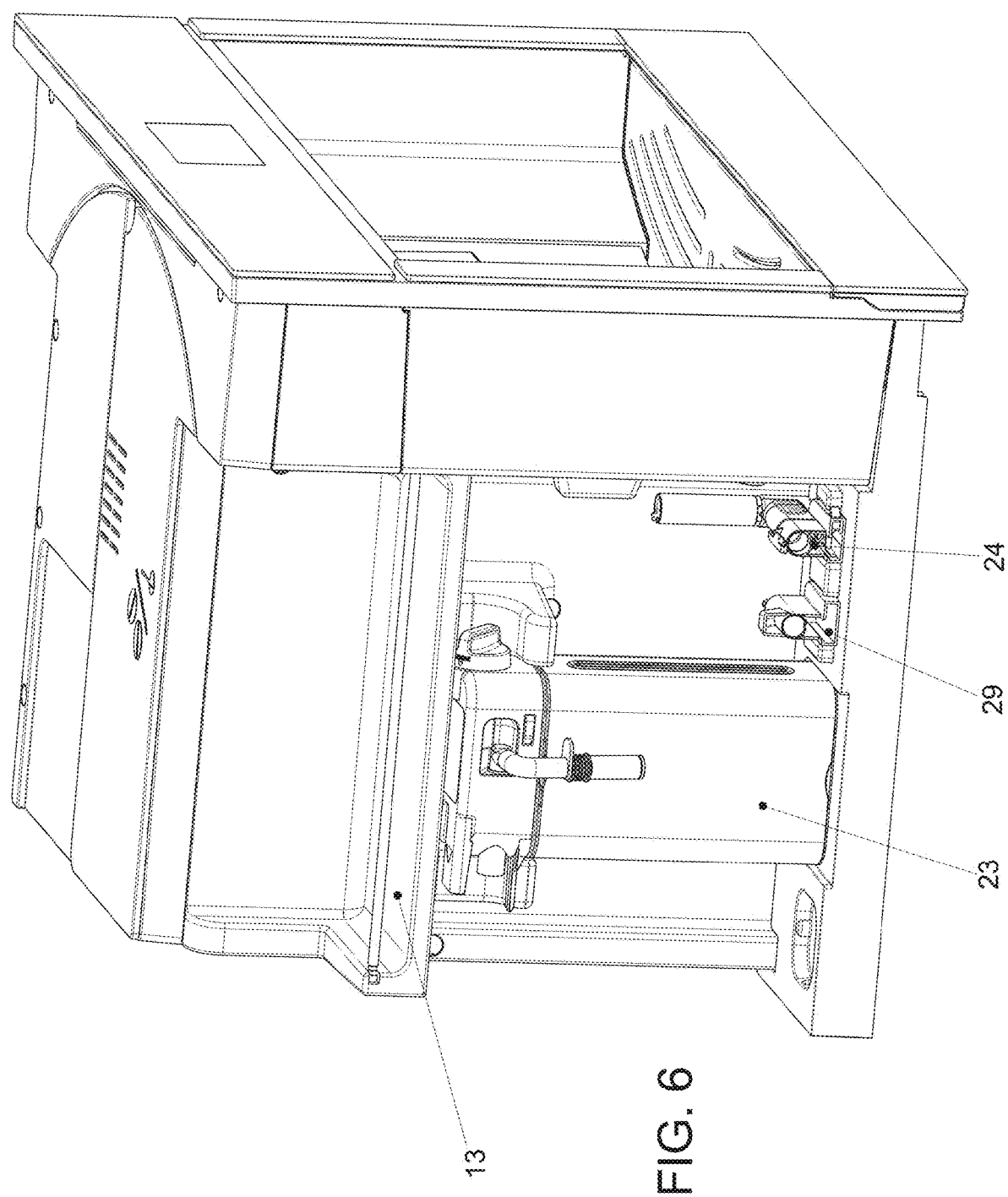
Figure 7:
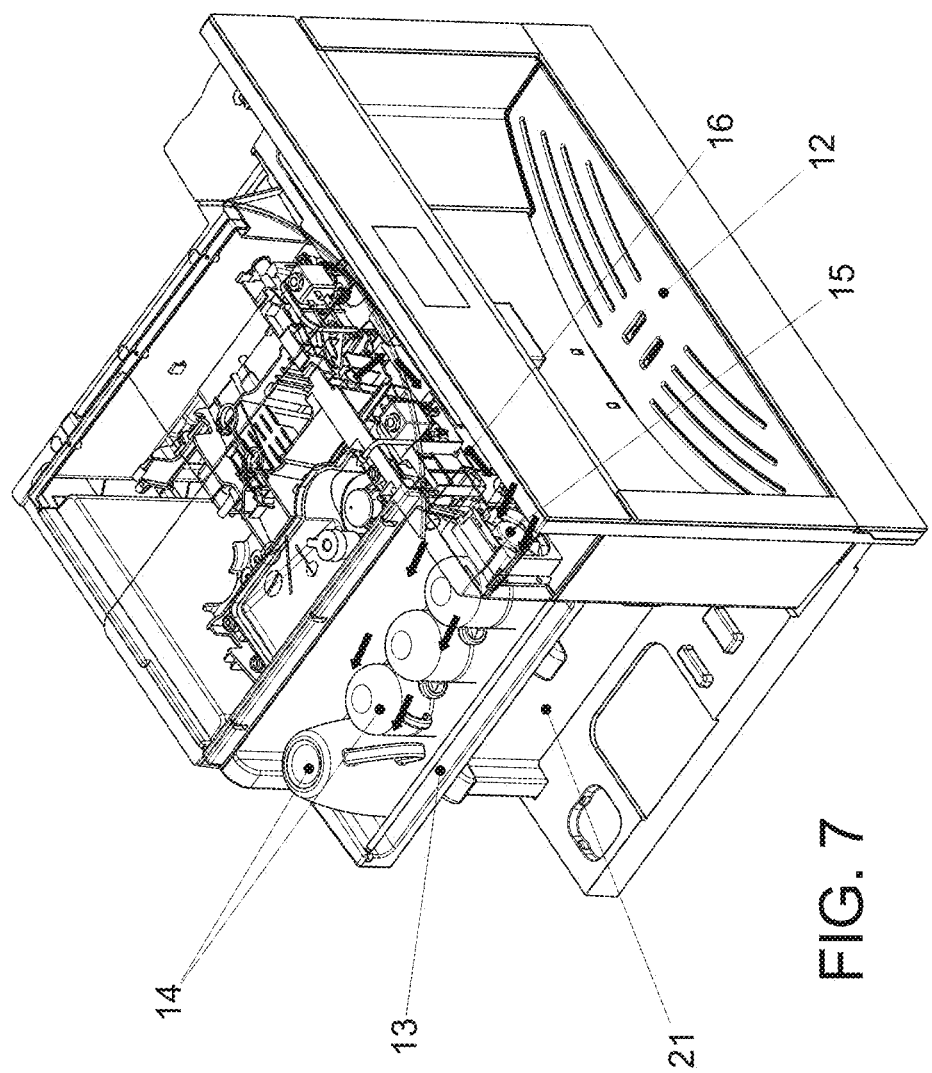
FIG. 7 shows an axonometric view from above of the built-in coffee machine with the cover of the hopper and the top of the frame illustrated in transparency.
Figure 8:
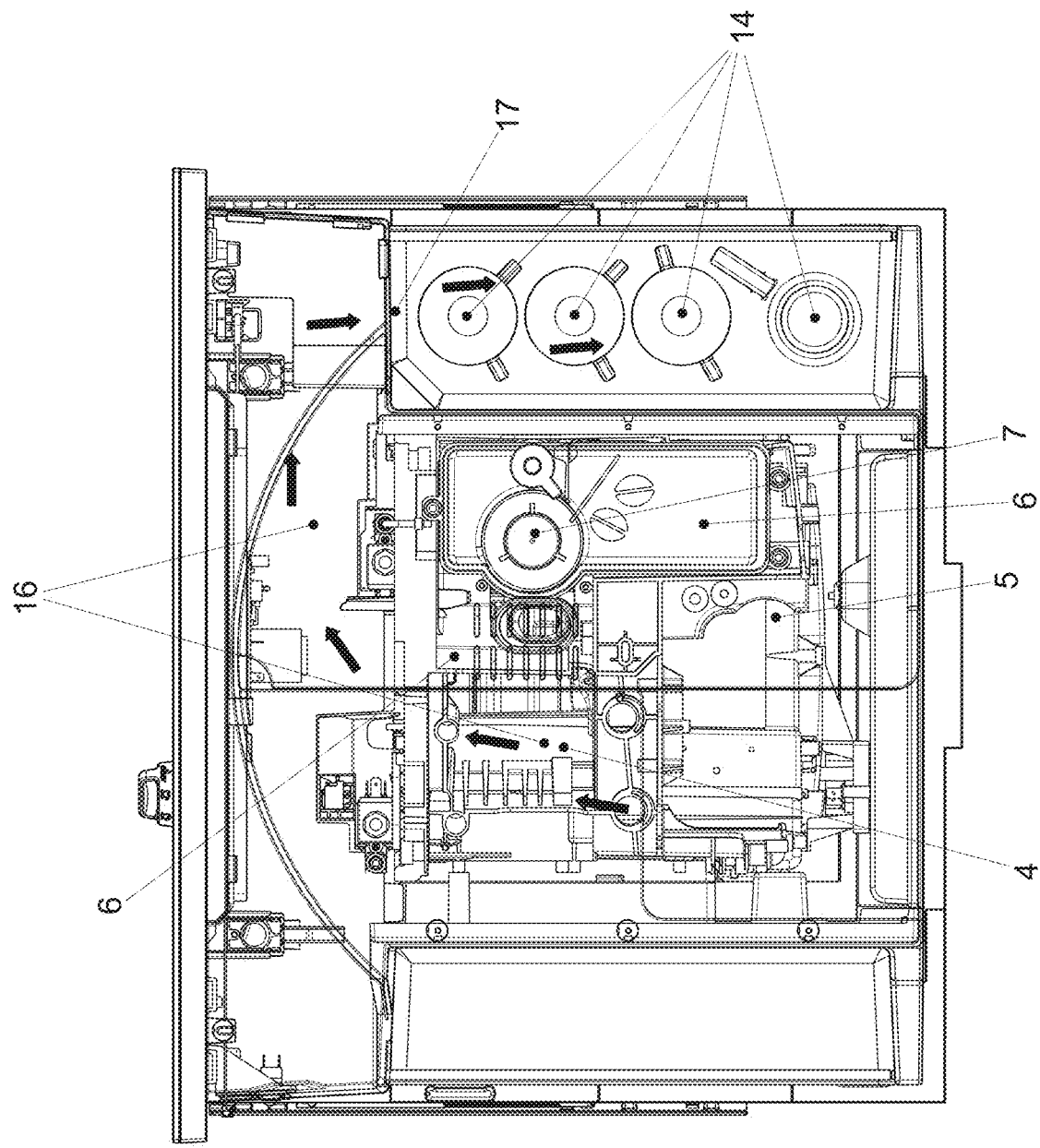
FIG. 8 shows a plan view from above of the built-in coffee machine with the cover of the hopper and the top of the frame illustrated in transparency.
Figure 9A:
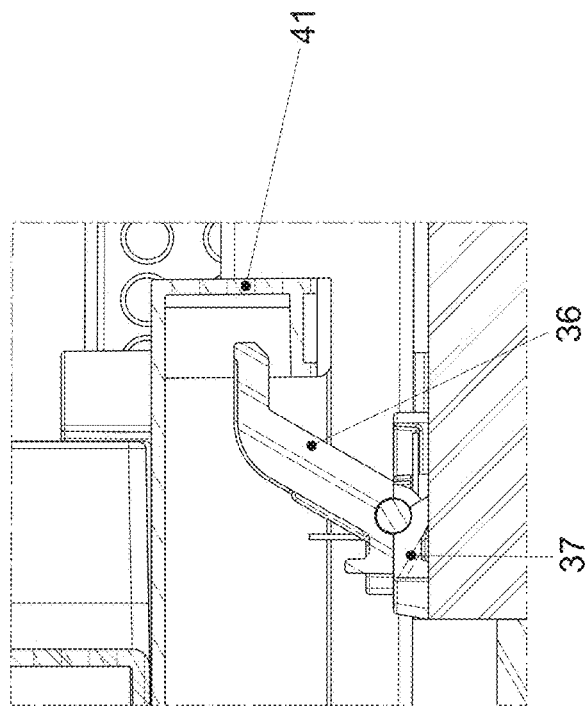
Figure 9B:
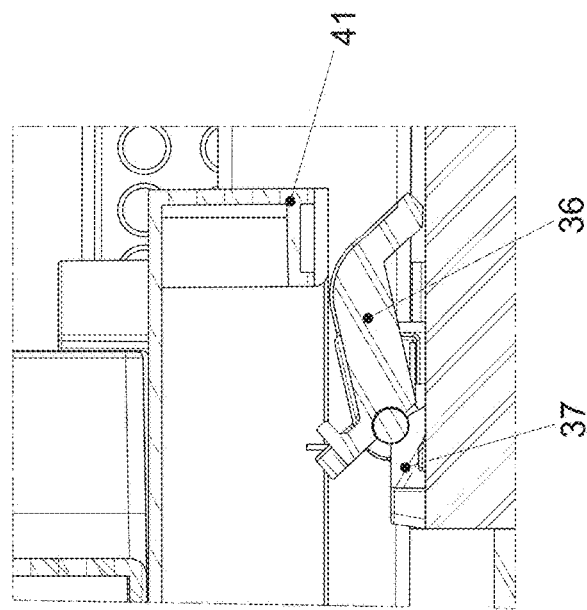
Figure 10:
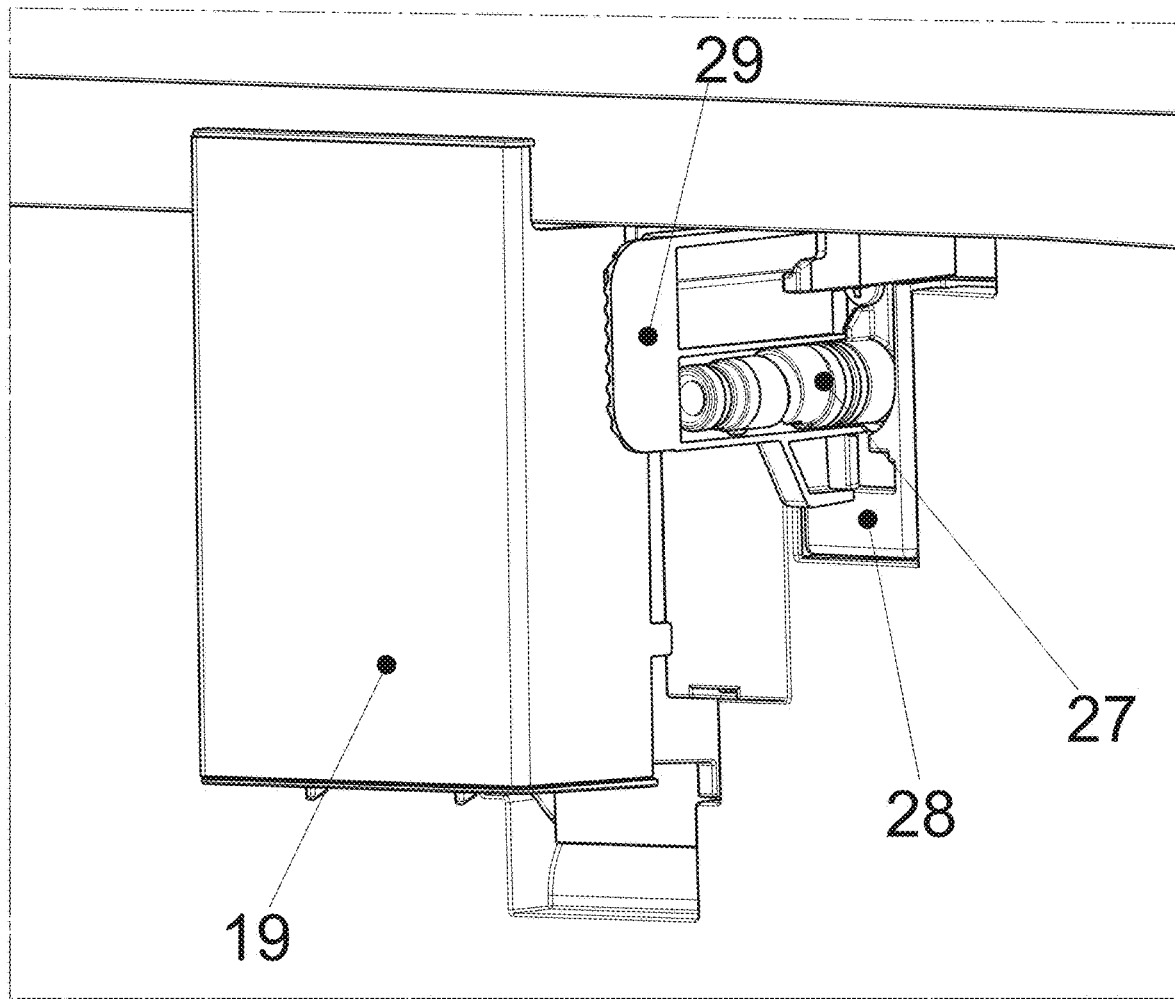

FIGS. 9a and 9b schematically show the anti-tipping means in the two positions;

FIG. 10 shows a detail of the front door zone having the passage opening for an external dispenser nozzle for dispensing water or steam.

With reference to the cited figures, a built-in coffee machine is shown and indicated in its entirety by reference number 1, which coffee machine can be housed in the compartment of a cabinet 2 having an open front side for introduction and extraction of the coffee machine 1.

The built-in coffee machine 1 comprises a box frame 3 housing several components among which a boiler 4, a supply pump 5 for supplying infusion water, an infuser unit 6, a grinder 7 for grinding coffee beans, a supply hopper 8 for supplying coffee beans to the grinder 7, a tank 9 for infusion water, power and control electronics 10, a container 11 for collecting spent coffee grounds, and a drip collector tray 12.

The boiler 4 is used both for heating the water destined to be used for infusion, and for other uses such as for example production of tea and production of steam.

The coffee machine 1 further has means for forced circulation of a flow of air in turn comprising an air channel 16 internal to the box frame 3 for the dehumidification and cooling of the environment internal to the box frame 3 and at least one fan 15 for the forced circulation of the flow of air along said air channel 16 (the air pathway is indicated in the figures by single-direction arrows).

The air flowing along the channel 16 is taken from outside the coffee machine 1.

The box frame 3 advantageously supports a support platform 13 for cups 14 towards which an air delivery section 17 of said air channel 16 is oriented for heating the cups 14.

The support platform 13 for the cups 14 is positioned on one of the two sides 3e of the box frame 3.

The support platform 13 is formed by a shelf projecting perpendicularly and externally from the side 3e of the frame 3, extending longitudinally in the direction of the depth of the coffee machine 1.

The fan 15 is positioned frontally of the support platform 13 and is oriented so as to cause the flow of air along the support platform 13 in the front-to-back direction.

The fan 15 thus has a horizontal rotation axis oriented in the direction of the depth of the coffee machine 1.

The air channel 16 is in communication with the hopper 8 so as to dehumidify and cool the ambient air to which the coffee beans are exposed in the hopper 8.

The air channel 16 is also in communication with the power and control electronics 10 which are unsealed as they operate in a conditioned atmosphere.

The air delivery section 17 and the boiler 4 are arranged on the opposite side with respect to a middle vertical plane of the box frame 3.

In this way, the thermal energy is removed from the hottest zone of the coffee machine 1 through the air channel 16 and conveyed to the coolest zone.

The box frame 3 has a base 3a, a hood 3b at which the hopper 8 is positioned, a bottom 3c, the above mentioned sides 3e and a front profile 3f providing direct access to the top side 12a of the drip collector tray 12 for positioning the cups 14 and to the tank 9 for removing and filling it when necessary.

The box frame 3 rotatably supports, behind the front profile 3f, an openable door 18 for access to the container for collecting spent coffee grounds 11 and to other components of the coffee machine 1.

The door 18 in turn supports an external dispenser 19 disconnectably connected to the infuser unit 6.

The door 18 includes a special passage opening 28 for an external dispenser nozzle for dispensing water or steam 27 supplied by the boiler 4.

The nozzle 27 projects frontally of the door 18 by the side of the dispenser 19.

The nozzle 27 is equipped with a special removable closing cap 29 configured not to interfere with the opening 28 when the door 18 is opened so as to be applied to or removed without having to open the door 18.

As well as closing the nozzle 27, the closing cap 29, when accessories are not connected to the nozzle 27, enables not only protecting the nozzle 27 from the formation and accumulation of dirt, but also concealing the nozzle 27, which can be of poor aesthetic appeal considering its in-view position.

The closing cap 29 is in particular applied on the nozzle 27 by means of a form and friction coupling.

The tank 9 for the infusion water is supported laterally to the door 18 in a seat afforded directly on the box frame 3, while the container 11 of the spent coffee grounds is directly supported by a rear protrusion of the drip collector tray 12 in such a way as to be extractable together with the drip collector tray 12.

The profile 3f has an access door 20 to the front side of the drip collector tray 12.

The door 20 is rotatably supported with the hinge axis horizontal and arranged along the lower side thereof.

The door 20 acts as a block for the drip collector tray 12, preventing accidental extraction thereof with the consequent possibility of splashing.

The opening of the doors 20 is thus a preliminary operation which indicates a precise intention to extract the drip collector tray 12.

One, or as illustrated, both the sides 3e of the box frame 3 are in a retracted position with respect to the lateral edge of a base 3a of the box frame 3 and delimit in cooperation therewith one or more lateral compartments 21 for containing accessories of the coffee machine 1.

A lateral compartment 21 is delimited superiorly by the support platform 13 for the cups 14, while a lateral compartment 21 at the opposite side 3e of the box frame 3 is superiorly delimited by a shelf 22.

Suitable mechanical retaining systems of the accessories are included in the lateral compartments 21, for example releasable engagement members 25, 26 for engaging the accessories.

The accessories that can be located in the lateral compartments 21 comprise for example a carafe for the milk 23 with an integrated milk emulsifier device connectable to the water or steam dispenser nozzle 27, a water dispenser tube 24 also connectable to the water or steam dispenser nozzle 27, etc.

The hopper 8 has a flat closing cover 30 constrained to move in its lie plane between an open position and a closed position.

More precisely, the closing cover 30 has a horizontal lie plane and is constrained to a vertical rotation pin (not shown).

The closing cover 30 has a tooth 32 able to interfere with a pulling stop 33.

The stop 33, fixed projectingly on the internal side of the upper wall 38 of the cabinet 2, by engaging the tooth 32 automatically pulls the cover 30 into the closed position when the coffee machine 1 is introduced into the compartment of the cabinet 2 with the cover 30 in the open position.

The cover 30 also has a retaining system for retaining it in the open position.

The illustrated case includes a ferromagnetic covering sheet for covering the internal side of the cover 30, which sheet enters the range of action of a magnet (not shown) supported by the hood 3a of the box frame 3 when the cover 30 is manually brought into the closed position.

The cover 30 can be opened manually and the magnetic force generated by the magnet is calibrated to enable manual closing of the cover 30.

Linear guides 34, 35 for supporting and extracting the coffee machine 1 from the compartment of the cabinet 2 are included.

The linear guides 34, 35 comprise fixed guiding parts 34 applied to the sides 39 of the cabinet 2 and constrained guiding parts 35 slidably constrained to the fixed guiding parts 34 and fixed to the bottom 3c of the box frame 3.

Lastly, anti-tipping means of the coffee machine 1 are provided, operative when the coffee machine 1 is in the extracted position from the compartment of the cabinet 2.

The anti-tipping means comprises a rotatable hook 36 equipped with a return spring 37.

The hook 36 is fixed on the internal side of the bottom wall 40 of the cabinet 2 and has a horizontal oscillation axis orientated in the direction of the width of the coffee machine 1.

The hook 36 is arranged and configured to interact with a rear edge 41 turned back towards the bottom 3c of the box frame 3.

During the assembly of the coffee machine 1 in the cabinet 2, the turned-back rear edge 41 of the bottom 3c of the box frame 3 interferes with the hook 36 by rotating it until it completely passes over the read edge 41.

Once disengaged from the turned-back rear edge 41 of the bottom 3c of the box frame 3, the hook 36, by effect of the return spring 37, is automatically reset.

With the coffee machine 1 completely extracted from the cabinet 2, the hook 36 thus engages the turned-back rear edge 41 of the bottom 3c of the box frame 3 and supports the coffee machine, among other things preventing damage to the guides 34, 35 in potentially dangerous situations, for example in a case where a child is hanging from the totally-extracted coffee machine 1.

One of the salient aspects of the invention is surely linked to the optimisation of the energy consumption obtained by directing the flow of cooling and dehumidifying air of the environment internal to the box frame 3 towards the support platform 13 for the cups 14.

The activation of the fan 15 is related to the activation of the coffee machine, in particular the electronics 10 correlates the status of the fan 15 to the status of the boiler 4, so that when the boiler 4 is active so is the fan 15 and when the boiler 4 is inactive so is the fan 15.

The power of the fan 15 can be adjusted using an appropriate user interface of the coffee machine 1.

Conversely, in traditional built-in coffee machines, the flow of cooling and dehumidifying air is dispersed into the atmosphere and the energy content thereof is in no way recycled so that special heaters are needed for the cups, which increase the energy requirements.

Further, a traditional cooling and dehumidifying system is conceived only to avoid sealing the electronics and thus standardise the process for producing the electronics.

Instead, with the present invention, the cooling and dehumidifying system integrates other functions, such as the above-mentioned heating of the cups but also the control of the environment parameters for conserving the coffee beans.

The control of the environment conservation parameters of the coffee beans in the hopper has a doubly-positive effect on the performance of the coffee machine: on the one hand the coffee beans, being hygroscopic, would tend to rapidly oxidise in a hot and humid environment and would give rise to a final served product having deteriorated organoleptic properties, on the other hand, an absence of temperature and moisture control of the environment for conservation of the coffee beans would lead to an absence of precise control over the grinding conditions and an approximation in the control of the parameters for carrying out the infusion cycle, with the risk of obtaining a final served product that does not perfectly respond to the selection made by the user.

The built-in coffee machine as conceived herein is susceptible to many modifications and variations, all falling within the scope of the inventive concept; furthermore, all the details are replaceable by technically equivalent elements.

In practice the materials used, as well as the dimensions, can be any according to the needs and the state of the art.

The invention claimed is:

1. A built-in coffee machine comprising the following components;
   a boiler; a supply pump for supplying infusion water; an infuser unit; a grinder for grinding coffee beans; a supply hopper for supplying coffee beans to the grinder; a tank for infusion water; power and control electronics; a container for collecting spent coffee grounds; and a drip collector tray;
   where some of the components are housed in a box frame;
   the coffee machine further comprising an air flow circulation system, the aft flow circulation system comprising an aft channel internal to said box frame for the dehumidification and cooling of an environment internal to said box frame and susceptible to increased temperature and humidity due to operation of the boiler, and at least one fan facilitating circulation of air flow from said environment along sad air channel to dehumidify and cool sad environment;
   wherein said box frame supports a support platform for cups, partitioned from said environment, towards which an air delivery section of said air flow circulation system is configured to direct air flow of the air channel over the support platform, where the support platform and the air delivery section are configured to heat sad cups with the air flow of the air channel from said environment.

2. The built-in coffee machine according to claim 1, wherein said support platform is positioned on an external part of a side of said box frame.

3. The built-in coffee machine according to claim 1, wherein said support platform extends longitudinally in a direction of depth of the coffee machine.

4. The built-in coffee machine according to claim 3, wherein said air delivery section points the air flow in a front to back direction of said support platform.

5. The built-in coffee machine according to claim 1 wherein said air channel is in communication with said supply hopper to condition a surrounding area to which the coffee beans in the supply hopper are exposed.

6. The built-in coffee machine according to claim 1, wherein said air channel is in communication with said power and control electronics to condition a surrounding area to which said power and control electronics are exposed, and in that said power and control electronics are not sealed.

7. The built-in coffee machine according to claim 1, wherein said boiler and said air delivery section are arranged on an opposite side with respect to a middle vertical plane of said box frame.

8. The built-in coffee machine according to claim 1, wherein said box frame has at least one side in a retracted position with respect to a lateral edge of a base of the box frame and delimits therewith one or more lateral compartments for containing accessories of the coffee machine.

9. The built-in coffee machine according to claim 1, wherein said supply hopper has a flat closing cover constrained to move in its plane between an open position and a closed position.

10. The built-in coffee machine according to claim 9, wherein said cover is constrained to a rotation pin.

11. The built-in coffee machine according to claim 1, wherein said box frame has a front profile providing direct access to the top side of the drip collector tray and to the infusion water tank, and behind said front profile an access door to said container for collecting spent coffee grounds, said door supporting an external dispenser of said infuser unit.

12. The built-in coffee machine according to claim 11, wherein said front profile has an access door to the front side of the drip collector tray.

13. The built-in coffee machine according to claim 11, further comprising an external dispenser nozzle for dispensing steam or water equipped with a removable closing cap configured not to interfere, when said door is opened, with an opening of said door through which said dispenser nozzle for dispensing steam or water is arranged.

14. An assembly comprising the built-in coffee machine in accordance with claim 1, and a cabinet having a compartment into which said coffee machine is set, wherein guides are provided for supporting and extracting said coffee machine from said compartment and a latching system configured to prevent said coffee machine from tipping over when extracted from said compartment.

15. The assembly according to claim 14, wherein said latching system comprises a rotatable hook equipped with a return spring.

16. The assembly according to claim 14, wherein an upper wall of said cabinet has a stop for pulling a flat closing cover into a closed position when said coffee machine is introduced into said compartment with said cover in an open position.

17. A method for regulating working environment parameters of a built-in coffee machine comprising a box frame housing a boiler, a supply pump for supplying infusion water, an infuser unit, a grinder for grinding coffee beans, a supply hopper for supplying coffee beans to the grinder, an infusion water tank, power and control electronics, a container for collecting spent coffee grounds, and a drip collector tray, where the built-in coffee machine further comprises an air flow circulation system, the air flow circulation system comprising an air channel internal to said box frame for the dehumidification and cooling of an environment internal to said box frame and susceptible to increased temperature and humidity due to operation of the boiler, and at least one fan facilitating circulation of air flow from said environment along said air channel to dehumidify and cool said environment and where said box frame supports a support platform for cups, partitioned from said environment, towards which an air delivery section of said air flow circulation system is configured to direct air flow of the air channel over the support platform;

where the method comprises the steps of:
operating said at least one fan;
channeling into an inside of said box frame a forced flow of air along said air channel to cool and dehumidify a surrounding area to which said power and control electronics and said coffee beans are exposed, and
directing said air flow to an outside of the box frame towards the support platform for the cups (14) so as to heat the cups.

\* \* \* \* \*